United States Patent [19]
Errichiello et al.

[11] Patent Number: 4,741,034
[45] Date of Patent: Apr. 26, 1988

[54] RECEPTACLE FOR TELEPHONE HANDSET

[75] Inventors: Dominic R. Errichiello, Bloomingdale; Rudolph W. Krolopp, Barrington Hills, both of Ill.

[73] Assignee: Motorola, Inc., Schaumburg, Ill.

[21] Appl. No.: 897,960

[22] Filed: Aug. 19, 1986

[51] Int. Cl.⁴ .................. H04M 1/06; H04M 1/08; H04M 1/22
[52] U.S. Cl. .................. 379/455; 379/396; 379/424; 379/425; 379/433
[58] Field of Search .............. 179/103, 100 R, 100 D, 179/100 C, 146 R; 379/433, 434, 424, 422, 425, 426, 427, 396

[56] References Cited

U.S. PATENT DOCUMENTS

| | | | |
|---|---|---|---|
| D. 276,809 | 12/1984 | Taylor | 379/455 |
| 2,375,681 | 5/1945 | Obergfell | 379/426 |
| 2,560,653 | 7/1951 | Laporte | 379/447 |
| 3,005,061 | 10/1961 | Cagen | 379/455 |
| 3,303,291 | 2/1967 | Schoemann | 379/426 |
| 3,396,244 | 8/1968 | Kowaleski | 379/422 |
| 3,489,860 | 1/1970 | Greenman et al. | 379/396 |
| 3,521,008 | 7/1970 | Tyson | 379/434 |
| 3,546,397 | 12/1970 | Laing et al. | 379/434 |
| 3,557,322 | 1/1971 | Walden | 379/455 |
| 3,889,071 | 6/1975 | Davis et al. | 379/455 |
| 4,056,696 | 11/1977 | Meyerle et al. | 379/419 |
| 4,068,102 | 1/1978 | Blomberg | 379/454 |
| 4,117,276 | 9/1978 | Zurawski | 379/437 |
| 4,130,740 | 12/1978 | Cogan | 379/433 |
| 4,153,822 | 5/1979 | Ueda et al. | 379/369 |
| 4,163,875 | 8/1979 | Cogan | 379/433 |
| 4,188,512 | 2/1980 | Lord | 379/427 |
| 4,454,387 | 6/1984 | Danielson et al. | 379/455 |
| 4,472,606 | 9/1984 | Krolopp et al. | 379/455 |
| 4,476,354 | 10/1984 | Uchino et al. | 379/445 |
| 4,491,696 | 1/1985 | Haskins et al. | 379/435 |
| 4,546,729 | 1/1986 | Mills | 379/396 |
| 4,581,490 | 4/1986 | Genender | 379/424 |
| 4,609,785 | 9/1986 | Drinkard et al. | 379/433 |

FOREIGN PATENT DOCUMENTS

| | | | |
|---|---|---|---|
| 0137382 | 4/1985 | European Pat. Off. | 379/433 |
| 58-29255 | 2/1983 | Japan | |
| 1400788 | 11/1972 | United Kingdom | |

Primary Examiner—Jin F. Ng
Assistant Examiner—Danita R. Byrd
Attorney, Agent, or Firm—Rollie Hackbart

[57] ABSTRACT

A telephone receiving apparatus (100) rigidly retains a telephone handset (200) without the need for a release lever. In the preferred embodiment, a moveable boss (108) and a rigid boss (106) engage corresponding notches (208 and 206) in the earpiece of the handset during insertion. The handset (200) is removed by moving it forward until the rigid boss (106) is cleared. The improved telephone receiving apparatus of the present invention may be advantageously utilized in mobile telephones and a variety of other applications where a telephone handset is subject to shock and vibration during normal use.

9 Claims, 3 Drawing Sheets

RECEPTACLE FOR TELEPHONE HANDSET

BACKGROUND OF THE INVENTION

The present invention is generally related to telephone instruments and more particularly related to an improved receptacle for telephone handsets.

In the radio telephone art, it is desirable to fixedly retain a telephone handset in a telephone receptacle due to the potentially rugged environment encountered in vehicular applications. Accordingly, the receptacle shown and described in U.S. Pat. No. 4,117,276 fixedly retains a telephone handset, which is released only by actuating a release lever. Another receptacle shown and described in U.S. Pat. No. Des. 276,809 fixedly retains the earpiece portion of a telephone handset, which is likewise released only by actuating a release lever. In another telephone receptacle shown and described in U.S. Pat. No. 4,472,606, a telephone handset has parallel grooves along opposite sides of the earpiece portion, which receive spring-loaded guiderails. However, the handset may be jarred loose during vibration since retention of the handset depends primarily upon the tension of guiderail springs. Accordingly, there is a need for an improved telephone receptacle that rigidly retains a telephone handset wihout the need for a release lever.

SUMMARY OF THE INVENTION

Accordingly, it an object of the present invention to provide improved telephone receiving apparatus that rigidly retains a telephone handset without the need for a release lever.

It is another object of the present invention to provide improved telephone receiving apparatus that rigidly retains a telephone handset subject to shock and vibration.

It is another object of the present invention to provide improved telephone receiving apparatus for a telephone handset which may be released by forward motion of the handset prior to removal.

Briefly described, the present invention encompasses improved telephone receiving apparatus for a telephone handset having first and second ends. The first end of the handset has first and second notches on two substantially opposite sides. The unique telephone receiving apparatus further comprises: a base including a recessed portion having a bottom and sides for receiving the first end of the handset; a first boss coupled to one of the sides of the recessed portion for inserting into the first notch; a second boss moveably disposed in a hole in the side of the recessed portion substantially opposite to the first boss for inserting into the second notch, the second boss having a canted surface for engaging the handset during insertion, and the second boss further having a substantially flat surface being disposed opposite to a substantially flat surface of the second notch for retaining the handset when inserted; and spring means coupled to the base for resisting movement of the second boss into the hole in the recessed portion, whereby the second boss moves at least partially into the hole during insertion and removal of the handset from the base.

DESCRIPTION OF THE PREFERRED EMBODIMENT

Figure 1:
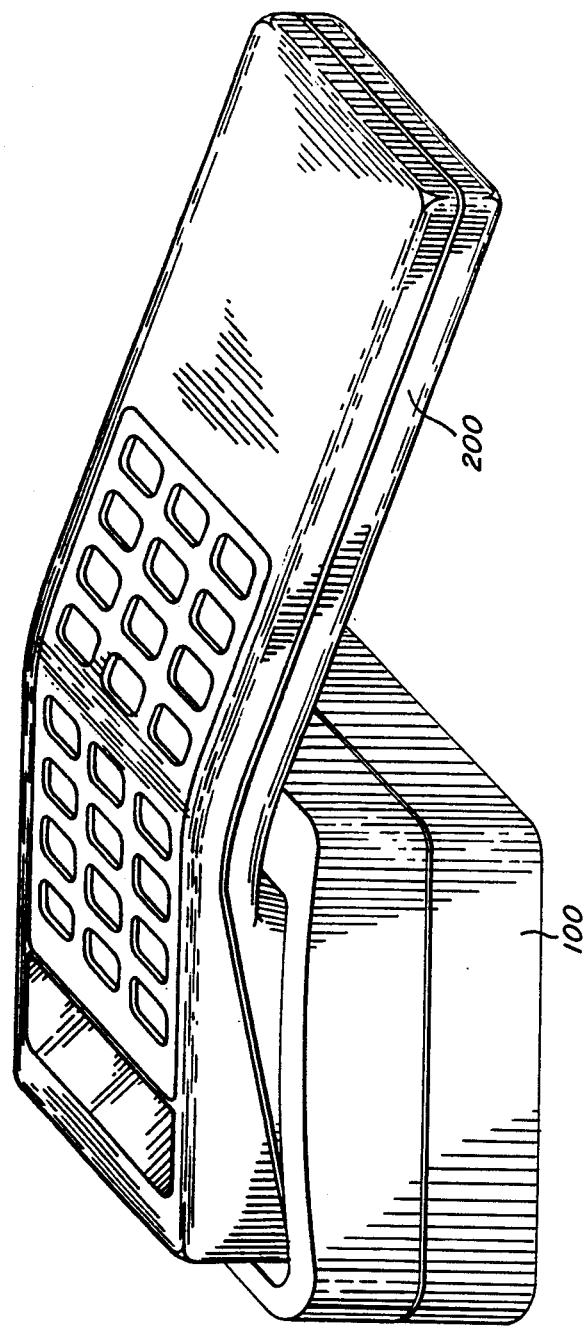
FIG. 1 is a perspective view of a telephone receptacle embodying the present invention together with a telephone handset.

In FIG. 1, there is illustrated a telephone receptacle 100 embodying the present invention together with a telephone handset 200. Telephone handset 200 may be any suitable commercially available handset preferably with the keypad on the top surface thereof. For example, telephone handset 200 may be one of the handsets shown and described in U.S. Pat. Nos. Des. 270,835, Des. 271,491, 4,117,276 and 4,472,606, all incorporated herein by reference thereto.

According to an important feature of the present invention, telephone receptacle 100 securely retains telephone handset 200 during vibration or shock without the need for a release lever for removal. Handset 200 is simply and easily released by urging it forward to release it from receptacle 100. These and other unique features of the present invention are described in more detail hereinbelow with reference to FIGS. 2 and 3.

Figure 2:
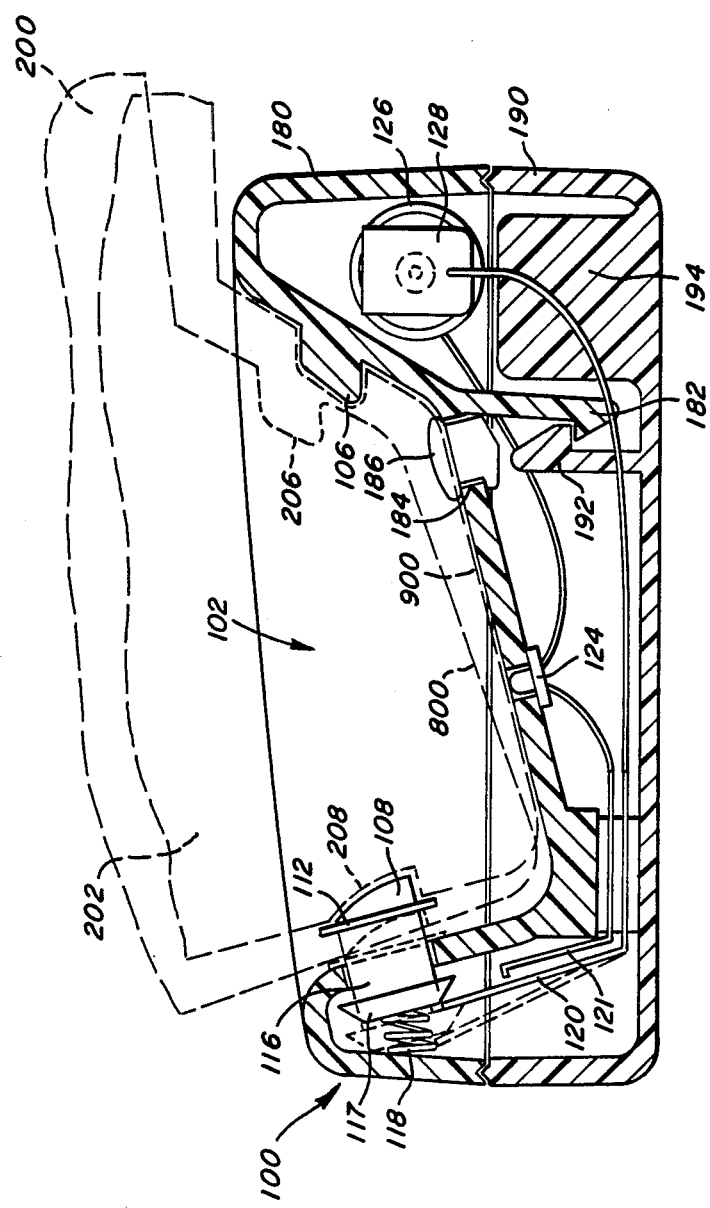
FIG. 2 is a cross-sectional view of the telephone receptacle in FIG. 1.

Referring to FIG. 2, there is illustrated a cross-sectional view of the telephone receptacle 100 in FIG. 1 taken lengthwise through its center. Receptacle 100, preferably comprised of plastic, has a recessed area 102 with a bottom opposing the earpiece surface of and sides encircling first end 202 of handset 200. Handset 200 is shown in two positions 800 and 900, where in position 900 handset 200 is locked in receptacle 100 and in position 800 handset 200 is released from receptacle 100.

Receptacle 100 in FIG. 2 includes top and bottom portions 180 and 190, respectively, which have opposing tongue-in-groove edges that lock together when tang 182 engages tang 192. The tongue-in-groove edges of top and bottom portions 180 and 190 produce an environmental seal when mated. Top portion 180 may be released from bottom portion 190 by inserting a tool into hole 184 and urging tang 182 away from tang 192. Stopper 194 protects tang 182 from damage by limiting its lateral movement. A rubber grommet 186, normally occupying hole 184, is compressed slightly by the earpiece surface of handset 200 preventing it from rattling when subjected to vibration. Receptacle 100 may be mounted in any suitable location simply by affixing bottom portion 190 with screws or adhesive. Once fixedly mounted, top portion 180 of receptacle 100 may be snapped into bottom portion 190, thereafter being removed for repair or repositioning.

Receptacle 100 in FIG. 2 further includes first and second bosses 106 and 108 which engage first and second notches 206 and 208, respectively, for securely retaining handset 200 in position 900. Bosses 106 and 108 preferably have flat bottom surfaces which oppose flat surfaces of notches 206 and 208, respectively, to securely hold handset 200. Boss 106 is rigidly attached to receptacle 100 and preferably has curved top and end surfaces. Boss 108 freely moves in a hole in the side of recessed area 102 and is urged outward by spring 118. The barrel 116 of boss 108 is shaped to fit the hole in the side of recessed area 102. The end surface of boss 108 is canted or curved to facilitate insertion of handset 200. Boss 108 also includes two lips 112 and 117. Lip 112 engages the edge of handset 200 during insertion and removal, and lip 117 prevents boss 108 from being pushed out when handset 200 is removed.

During insertion, handset may first engage boss 106 and thereafter rotate downward, pushing boss 108 back into receptacle 100 until boss 108 seats into notch 208. Handset 200 is securely retained in receptacle 100 by the flat surfaces of bosses 106 and 108 over the flat surfaces of notches 206 and 208, respectively. Similarly, handset 200 is removed from receptacle 100 by moving handset forward until boss 106 and end 202 can be removed from recessed area 102.

Receptacle 100 in FIG. 2 also includes leaf switch 120 and 121, light emitting diode (LED) 124 and battery 126 for illuminating the recessed area 102 when handset 200 is removed. Lip 117 moves leaf 120 away from leaf 121 to break the connection of LED 124 to battery 126 when handset 200 is inserted into receptacle 100. When handset 200 is removed, spring 118 forces lip 117 against the side of receptacle 100 and leaf 120 contacts leaf 121 turning on LED 124. Thus, LED 124 is "on" when handset 200 is removed from, and "off" when handset 200 is inserted into, receptacle 100. Battery 126 is mounted in a suitable commercially available bracket 128 and, if necessary, a resistor is included in series with wires coupling battery 126 to leaf 120 and LED 124.

Figure 3:
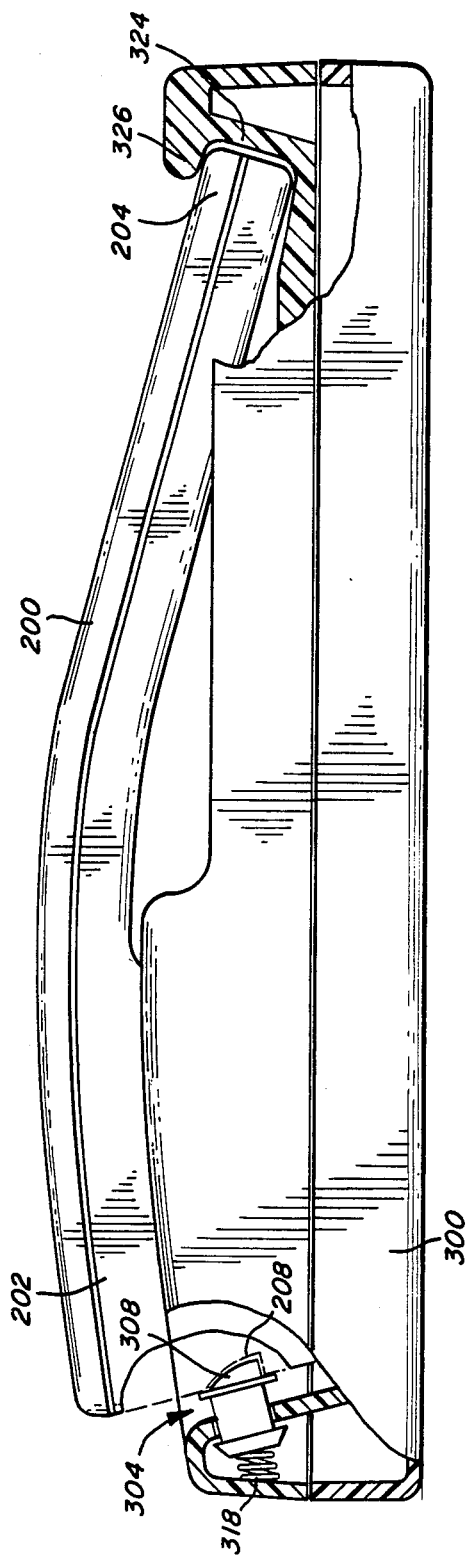
FIG. 3 is a partial cross-sectional view of an another telephone receptacle embodying the present invention together with a telephone handset.

Referring next to FIG. 3, there is illustrated a partial cross-sectional view of an another telephone receptacle 300 embodying the present invention together with telephone handset 200. Receptacle 300 need only include one boss 308 with associated spring 318. Handset 200 is placed into receptacle 300 by first inserting end 204 into recessed area 324 and then inserting end 202 into recessed area 304, pushing boss 308 back into receptacle 300 until boss 308 seats into notch 208. As with receptacle 100 in FIG. 2, handset 200 is securely retained in receptacle 300 by the flat surface of boss 308 over the flat surface of notch 208 and lip 326 extending over end 204. Similarly, handset 200 is removed from receptacle 300 by moving handset forward until lip 326 is cleared and end 204 can be removed from recessed area 324.

In summary, improved telephone receiving apparatus has been described that rigidly retains a telephone handset without the need for a release lever. In the preferred embodiment, a moveable boss and a rigid boss engage corresponding notches in the earpiece of the handset during insertion. The handset is removed by moving it forward until the rigid boss is cleared. The improved telephone receiving apparatus of the present invention may be advantageously utilized in mobile telephones and a variety of other applications where a telephone handset is subject to shock and vibration during normal use.

What is claimed is:

1. Telephone apparatus comprising, in combination:
a handset having first and second ends, the first end of the handset having first and second notches on two substantially opposite sides; and
a base including:
a recessed portion having a bottom and sides for receiving the first end of the handset;
a first boss coupled to one of the sides of the recessed portion for inserting into the first notch;
a second boss moveably disposed in a hole in the side of the recessed portion substantially opposite to said first boss for inserting into the second notch, said second boss having a first end with a canted surface for engaging the handset during insertion, said second boss having a second end being disposed in said hole, and said second boss having a substantially flat bottom surface being disposed opposite to a substantially flat surface of said second notch for retaining the handset when inserted; and
spring means coupled to the base for resisting movement of said second boss into the hole in the recessed portion, whereby said second boss moves at least partially into the hole during insertion and removal of the handset from the base.

2. The telephone apparatus according to claim 1, wherein said first boss has an end with a canted surface for engaging the handset during insertion, and said first boss has a substantially flat bottom surface being disposed opposite to a substanially flat surface of said first notch for retaining the handset when inserted.

3. The telephone apparatus according to claim 1, wherein said second end of said second boss has a lip extending outwardly for engaging the edges of the hole in the base.

4. The telephone apparatus according to claim 1, wherein said base further includes top and bottom portions each having a tang which engage one another for locking said top portion to said bottom portion.

5. The telephone apparatus according to claim 4, wherein said top and bottom portions have tongue-in-groove opposing edges for producing an environmental seal when said top portion is locked to said bottom portion.

6. The telephone apparatus according to claim 1, wherein said base further includes:
means for illuminating said first recessed area when said illuminating means is enabled; and
switch means coupled to said second boss for enabling said illuminating means when said handset is removed from said base.

7. Telephone apparatus comprising, in combination:
a handset having first and second ends, the first end of the handset having at least one notch; and
a base including:
a first recessed portion having a bottom and sides for receiving the first end of the handset;
a second recessed portion having a lip for receiving the second end of the handset;
a boss moveably disposed in a hole in the side of the first recessed portion for inserting into the notch, said boss having a first end with a canted surface for engaging the handset during insertion, said boss having a second end being disposed in said hole, and said boss having a substantially flat bottom surface being disposed opposite to a substantially flat surface of said notch for retaining the handset when inserted; and
spring means coupled to the base for resisting movement of said boss into the hole in the first recessed portion, whereby said boss moves at least partially into the hole during insertion and removal of the handset from the base.

8. The telephone apparatus according to claim 7, wherein said second end of said boss has a lip extending outwardly for engaging the edges of the hole in the base.

9. The telephone apparatus according to claim 7, wherein said base further includes:
means for illuminating said first recessed area when said illuminating means is enabled; and
switch means coupled to said boss for enabling said illuminating means when said handset is removed from said base.

* * * * *